United States Patent
Kwa et al.

(10) Patent No.: US 10,049,002 B2
(45) Date of Patent: Aug. 14, 2018

(54) DISPLAY INTERFACE BANDWIDTH MODULATION

(71) Applicant: Intel Corporation, Santa Clara, CA (US)

(72) Inventors: Seh W. Kwa, Saratoga, CA (US); Taesung Kim, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 14/315,667

(22) Filed: Jun. 26, 2014

(65) Prior Publication Data

US 2015/0381990 A1 Dec. 31, 2015

(51) Int. Cl.
*H04N 19/166* (2014.01)
*G06F 11/10* (2006.01)
(Continued)

(52) U.S. Cl.
CPC ............ *G06F 11/1004* (2013.01); *G06F 3/14* (2013.01); *G09G 5/006* (2013.01); *H04N 5/63* (2013.01);
(Continued)

(58) Field of Classification Search
CPC ...... H04N 19/89; H04N 19/166; H04N 19/65; H04N 19/42; H04N 19/59; H04N 19/102; H04N 21/44227; H04N 21/234; H04N 21/4516; H04N 21/43635; H04N 21/2402; H04N 21/6131; H04N 21/64738; H04N 21/43637; H04N 19/14; H04N 19/625; H04N 19/182; H04N 19/176;
(Continued)

(56) References Cited

U.S. PATENT DOCUMENTS 4,742,544 A * 5/1988 Kupnicki ............. H04N 7/1696
348/E7.056
5,208,666 A * 5/1993 Elkind ................... H04N 19/89
348/192
(Continued)

FOREIGN PATENT DOCUMENTS

JP H08-116274 5/1996
JP 2001-285237 10/2001
(Continued)

OTHER PUBLICATIONS

L. Favalli et al., "A Low Refresh-Rate Video Sequences Compression Technique Using Quadtrees and Adaptive Spatial Sampling", Univarsita di Pavia, Italy; IPAA97 Jul. 1997, Pub.No. 443 © IEE 1997.*

(Continued)

*Primary Examiner* — Dramos I Kalapodas
(74) *Attorney, Agent, or Firm* — Trop Pruner & Hu, P.C.

(57) ABSTRACT

Bandwidth modulation may enable most of the display data-path to operate at a lower performance level to reduce power consumption by using compression as part of the display engine capability. Use of compression may afford a bit rate reduction and/or lane width reduction on the display interface to support high resolution display. With the bit rate and/or lane reduction and selective use of a refresh rate reduction, this technique can be used to lower the power consumption of the display data-path.

6 Claims, 5 Drawing Sheets

(51) Int. Cl.
*H04N 5/63* (2006.01)
*H04N 21/4402* (2011.01)
*H04N 21/443* (2011.01)
*G06F 3/14* (2006.01)
*G09G 5/00* (2006.01)

(52) U.S. Cl.
CPC . *H04N 21/4436* (2013.01); *H04N 21/440263* (2013.01); *G09G 2340/02* (2013.01); *G09G 2340/0435* (2013.01); *G09G 2350/00* (2013.01); *G09G 2370/04* (2013.01)

(58) Field of Classification Search
CPC .... H04N 19/186; H04N 19/15; H04N 19/154; H04N 19/12; H04N 19/172; H04N 5/144; H04N 21/23418; H04N 5/70; H04N 21/41407; H04N 21/4436; G06F 11/1004; G06F 9/4418; G06F 9/4403; G06F 3/14; G06F 3/1423; G06F 3/1462; G09G 2370/10; G09G 2330/021; G09G 2370/04; G09G 2360/08; G09G 2330/027; G09G 2330/026; G09G 2352/00; G09G 2360/06; G09G 2330/02; G09G 5/001; G09G 5/36; G09G 2340/02; G09G 2360/18; G09G 3/3611; G09G 3/20; G09G 3/3406; G09G 2340/0435; G09G 2370/045; G09G 2320/103; G09G 2330/022; G09G 5/006; G09G 5/363; G09G 2350/00; G09G 2370/047; G09G 2370/16; G09G 2370/12; G09G 2358/00; G09G 2370/027; G09G 2320/106; G09G 5/003; G06T 1/60; H04L 65/80; H04L 65/602; H03M 13/09

See application file for complete search history.

(56) References Cited

U.S. PATENT DOCUMENTS

| | | | | |
|---|---|---|---|---|
| 5,410,360 A * | 4/1995 | Montgomery | H04N 1/00098 | 348/432.1 |
| 5,692,093 A * | 11/1997 | Iggulden | G11B 15/023 | 348/E7.091 |
| 5,872,784 A * | 2/1999 | Rostoker | G06F 13/128 | 348/467 |
| 6,138,164 A * | 10/2000 | Kobata | G06F 3/1454 | 709/208 |
| 6,909,753 B2 * | 6/2005 | Meehan | H04N 21/234327 | 375/240.27 |
| 8,745,366 B2 * | 6/2014 | Wyatt | G09G 5/36 | 345/522 |
| 8,749,541 B2 * | 6/2014 | Kim | G09G 3/20 | 345/211 |
| 8,767,820 B2 * | 7/2014 | Montag | H04L 65/602 | 375/240.01 |
| 2002/0025060 A1 * | 2/2002 | Kimura | G06T 1/005 | 382/100 |
| 2006/0026181 A1 * | 2/2006 | Glickman | H04N 1/00204 | |
| 2007/0002059 A1 * | 1/2007 | Booth | G09G 3/3611 | 345/505 |
| 2007/0296822 A1 * | 12/2007 | Lan | H04N 21/4126 | 348/211.99 |
| 2009/0041129 A1 * | 2/2009 | Suh | H04H 20/55 | 375/240.25 |
| 2009/0150942 A1 * | 6/2009 | Nakano | H04L 45/24 | 725/75 |
| 2010/0145713 A1 * | 6/2010 | Carroll | G10L 19/167 | 704/500 |
| 2010/0265392 A1 | 10/2010 | Shao | | |
| 2011/0078536 A1 * | 3/2011 | Han | G06F 3/1462 | 714/758 |
| 2011/0247033 A1 | 10/2011 | Okada | | |
| 2012/0182223 A1 * | 7/2012 | Zeng | G06F 3/0416 | 345/173 |
| 2012/0309319 A1 * | 12/2012 | Nojiri | H04N 21/234 | 455/66.1 |
| 2013/0235055 A1 * | 9/2013 | Kim | G09G 5/006 | 345/545 |
| 2014/0146098 A1 | 5/2014 | Furihata et al. | | |
| 2014/0321527 A1 * | 10/2014 | Inata | H04N 21/44209 | 375/240.01 |
| 2015/0264298 A1 * | 9/2015 | Colenbrander | H04N 7/013 | 345/547 |
| 2016/0165275 A1 * | 6/2016 | Yamashita | H04N 21/4363 | 348/441 |
| 2017/0104995 A1 * | 4/2017 | Lunesu et al. | H04N 19/12 | |

FOREIGN PATENT DOCUMENTS

| | | |
|---|---|---|
| JP | 2008-312052 | 12/2008 |
| KR | 20130051817 A | 5/2013 |

OTHER PUBLICATIONS

Taiwan IPO Office Action issued in corresponding TW application 104116067 dated Apr. 12, 2016 (11 pages).
Taiwan IPO search report issued in corresponding TW application 104116067 dated Apr. 12, 2016 (2 pages).
Taiwan Office Action issued in corresponding TW application 104116067 dated Oct. 31, 2016 (6 pages).
PCT Written Opinion and Search Report dated Sep. 24, 2015 in corresponding PCT/US2015/037673 (11 pages).
Han, K., et al., "Using checksum to reduce power consumption of display systems for low-motion content," (Oct. 2009), in Computer Design, 2009. Iccd 2009_ IEEE International Conference (7 pp.).
EP Extended Search Report dated Nov. 8, 2017 in corresponding 15812561.7-1908/3162050 PCT/US2015037673 (6 pages).
JP office action dated Feb. 14, 2018 in corresponding JP2016-567919 (7 pages).

\* cited by examiner

DISPLAY INTERFACE BANDWIDTH MODULATION

BACKGROUND

Power optimization of the display data-path from processor to display becomes ever more important with the growth of high resolution displays especially in mobile processor-based devices. Display bandwidth demand is pushing the performance requirements along the display data-path from where the rendered image resides to the panel electronics in the panel. For example, the bit rate capability of the display interface is getting higher while compression techniques are added to accommodate the growing display bandwidth demand.

BRIEF DESCRIPTION OF THE DRAWINGS

Some embodiments are described with respect to the following figures.

DETAILED DESCRIPTION

Figure 1:
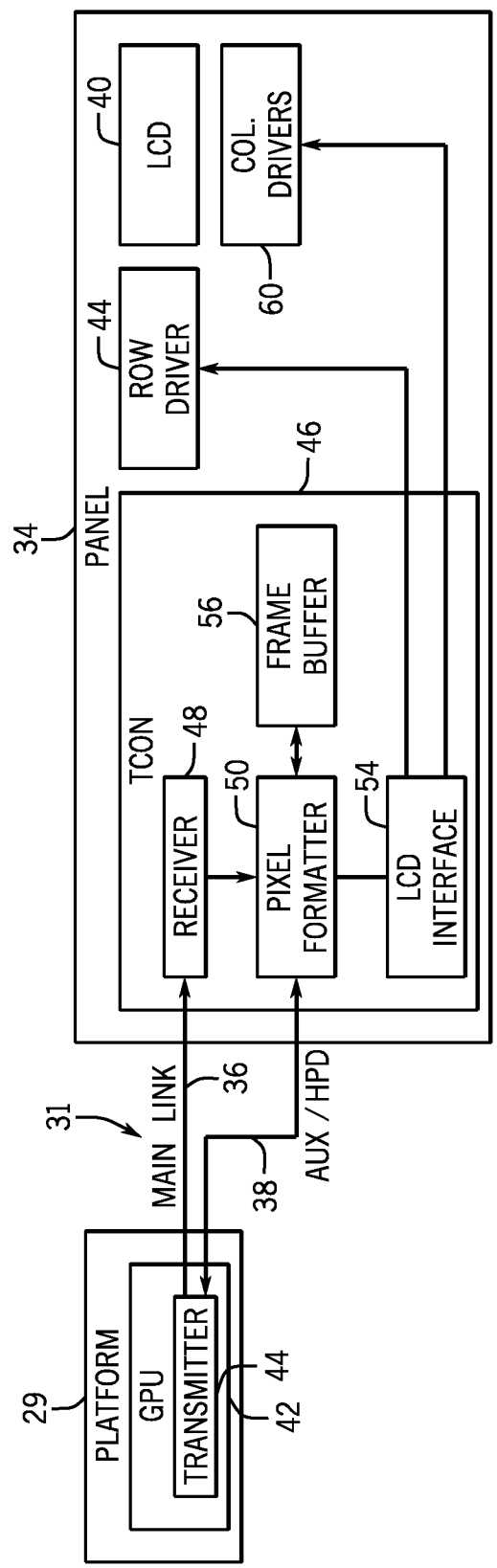
FIG. 1 is a hardware depiction for one embodiment.

Bandwidth modulation may enable parts of the display data-path to operate at a lower performance level to reduce power consumption by providing a compression capability as part of the display engine. Use of compression may afford a bit rate reduction and/or lane width reduction on the display interface to support higher resolution display. With the bit rate and/or lane reduction and selective use of a refresh rate reduction, the power consumption of the display data-path may be reduced.

Compression techniques may enable lowering a display's refresh rate, reducing interconnect bit rate, reducing the number of lanes on the display interface or all three reductions. The following table illustrates how compression can benefit. The first column from the left contains four different display resolutions with each pixel represented by 24-bit per pixel color precision. The second column from the left shows the number of lanes required at different bit rates when the refresh rate is 60 Hz and there is no compression. For example, RBR stands for 1.62 Gbps data rate on a DisplayPort® display interface, HBR1 stands for 2.7 Gbps data rate and HBR2 stands for 5.4 Gbps.

| 24-bit per pixel | No Comp., 60 Hz with refresh | Comp. = 2, 60 Hz refresh | Lower to 50 Hz with Comp. = 2 |
|---|---|---|---|
| 2560x1440 | 4 lanes @ RBR | 2 lanes @ RBR | 2 lanes @ RBR |
| 2800x1800 | 4 lanes @ HBR1 | 2 lanes @ HBR1 or 4 lanes @ RBR | 2 lanes @ HBR1 or 4 lanes @ RBR |
| 3200x1800 | 4 lanes @ HBR1 | 2 lanes @ HBR1 or 4 lanes @ RBR | 2 lanes @ HBR1 or 4 lanes @ RBR |
| 3840x2160 | 4 lanes @ HBR2 | 2 lanes @ HBR2 or 4 lanes @ HBR1 | 2 lanes @ HBR2 or 4 lanes @ RBR |

When compression is applied to achieve a compression ratio of 2 (50% reduction of bandwidth) in column 3, the number of lanes and the bit rates can be lowered to reduce power consumption accordingly. For 3840×2160 display resolution, a 50 Hz refresh rate can further reduce the bit rate, as shown in column 4.

Even when the power swings at the transmitter and receiver are small, other advantages include (a) a power consumption reduction beyond the transmitter/receivers in term of phase locked loop (PLL) clock recovery and, digital domain toggle rate, (b) the manufacturing the panel electronics may be easier, as well as (c) lower bit rate eases the integration of panel electronics using a Chip-on Glass technique, which is a lower power consumption panel design.

One challenge with selecting a compression technique is that it is non-trivial to maintain lossless compression across all types of images. When compressing an image begins to result in loss, it is desirable to reduce the compression ratio to maintain image quality. Also, it can be expensive to compress an image and then decompress it to determine which compression ratio (or none) is appropriate. Lossy compression, widely deployed for moving images (or changing images), and the fact that the panel electronics decompresses the image to provide feedback on the quality of compression, can be advantageously applied to address this challenge.

Referring to FIG. 1, in accordance with one embodiment, the display interface 31 provides the interface between a display, such as a flat panel display, and a processor-based device, such as a mobile computing device. However, other embodiments may use different displays and different computing platforms. The computing platform 29, in one embodiment, may include a printed circuit motherboard or graphics card. It may be connected to a display panel 34 using an interface 31, such as an embedded DisplayPort interface with panel self refresh (PSR). See the Embedded DisplayPort Specification, Version 1.4, dated February, 2013. The DisplayPort specification provides a main link 36, an auxiliary or AUX link, and a Hot Plug Detect (HPD) link 38. In one embodiment, a liquid crystal display (LCD) display 40 receives pixels generated by a graphics processing unit 42 on the platform 29. The graphics processing unit may include an embedded DisplayPort transmitter 44 that sends signals over the main link and receives auxiliary and HPD signals over those links.

The graphics processing unit 42 communicates via the main link with an embedded DisplayPort touch controller (TCON) 46, in one embodiment, with an embedded DisplayPort receiver 48. The pixel formatter 50 communicates with an LCD interface 54 which provides input signals to row and column drivers 44 and 60. The pixel formatter 50 also communicates bi-directionally with a frame buffer 56 inside the panel.

While a DisplayPort display interface is described, other interfaces may also be used, including those defined by the MIPI Alliance.

Figure 2:
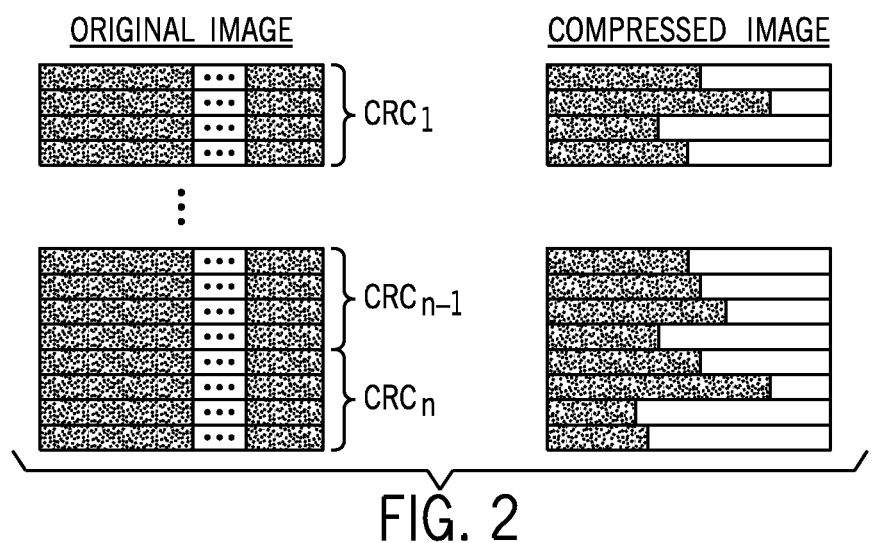
FIG. 2 is a flow diagram for a checksum mechanism according to one embodiment.

First, a checksum mechanism is created for each line or each block (multiple lines) of the original image as illustrated in FIG. 2. For example, a combination of the checksum plus post-processing such as root-mean squared of error may be used in one embodiment. An example of a checksum is cyclic recovery check (CRC). These CRC values may be sent to the panel electronics with the compressed image so that the panel electronics can recalculate the CRC values (i.e. $CRC_1 \ldots, CRC_{n-1}$, and $CRC_n$) of the image it decompresses to determine the quality of the compression. The values before and after compression and transmission are compared to see if any information was lost. Note that the compression ratio may vary from line to line or block to block, as indicated in FIG. 2, by the different vertical extents of the lines of the compressed image.

Figure 3:
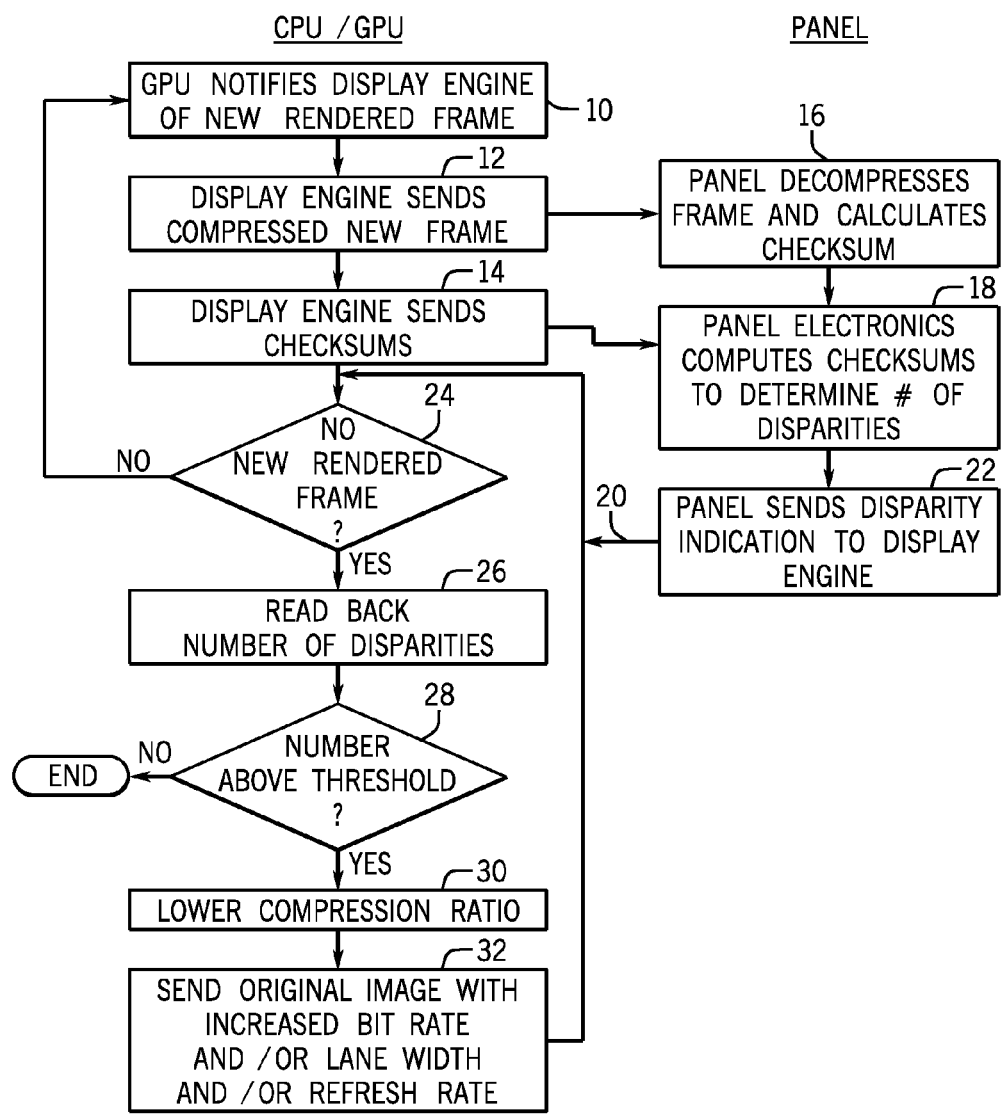
FIG. 3 is a flow chart for bandwidth modulation according to one embodiment.

A sequence, shown in FIG. 3, may be implemented in hardware, software and/or firmware. In software and hardware embodiments, it may be implemented by one or more non-transitory computer readable media storing instructions executed by a processor to perform the sequence depicted. Examples of such media include optical, magnetic, and semiconductor storages. The sequence may be implemented by any processor, including, for example, a graphics processing unit or, as another example, a central processing unit.

The flow diagram in FIG. 3 shows an approach involving optimizing lane width and bit rate using compression. When the graphics processing unit notifies the display engine (for example, with the transmitter 44) of a new rendered frame 10, the display engine sends the new image, using 50 Hz (or remains at 60 Hz) as an example, with a compression ratio (for example two) with minimum lane width and bit rate, in one embodiment, as shown in step 12. The display engine also sends the associated CRC values (step 14) for the original uncompressed frame if this is the first transmission of the frame. The checksums may be sent with, after, or before the frame. The panel electronics (for example, receiver 48) decompresses the image and calculates the received CRC values at 16 to determine the number of disparities against the original CRC values at 18. The number of disparities indicates the lossy or the transmission.

In one embodiment, the display engine may also specify a disparity level threshold as part of the frame transmission.

The number of disparities can be provided back (at 22) to the display engine as a feedback 20 at the end of the frame interval, such as during the back porch portion of the vertical blanking interval, which is the area of a composite video signal defined as the time between the end of a color burst and the start of active video. If there are no new rendered frames (diamond 24), the display engine reads the feedback (block 26) to adjust the compression rate or technique accordingly (block 28), which may also modify the lane width, bit rate and/or refresh rate should the compressed image quality fail a desired lossiness threshold (step 28) based, for example, on the number of CRC disparities relative to a threshold. Then the original image may be resent (block 32) with any increased bit rate and/or lane width and/or refresh rate. In another embodiment, the panel may simply indicate whether a disparity threshold, provided by the display engine, was exceeded.

In one embodiment, the panel may include a register that stores the number of disparities. The platform may read the register, causing the panel to transmit the information in the register to the platform.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 4:
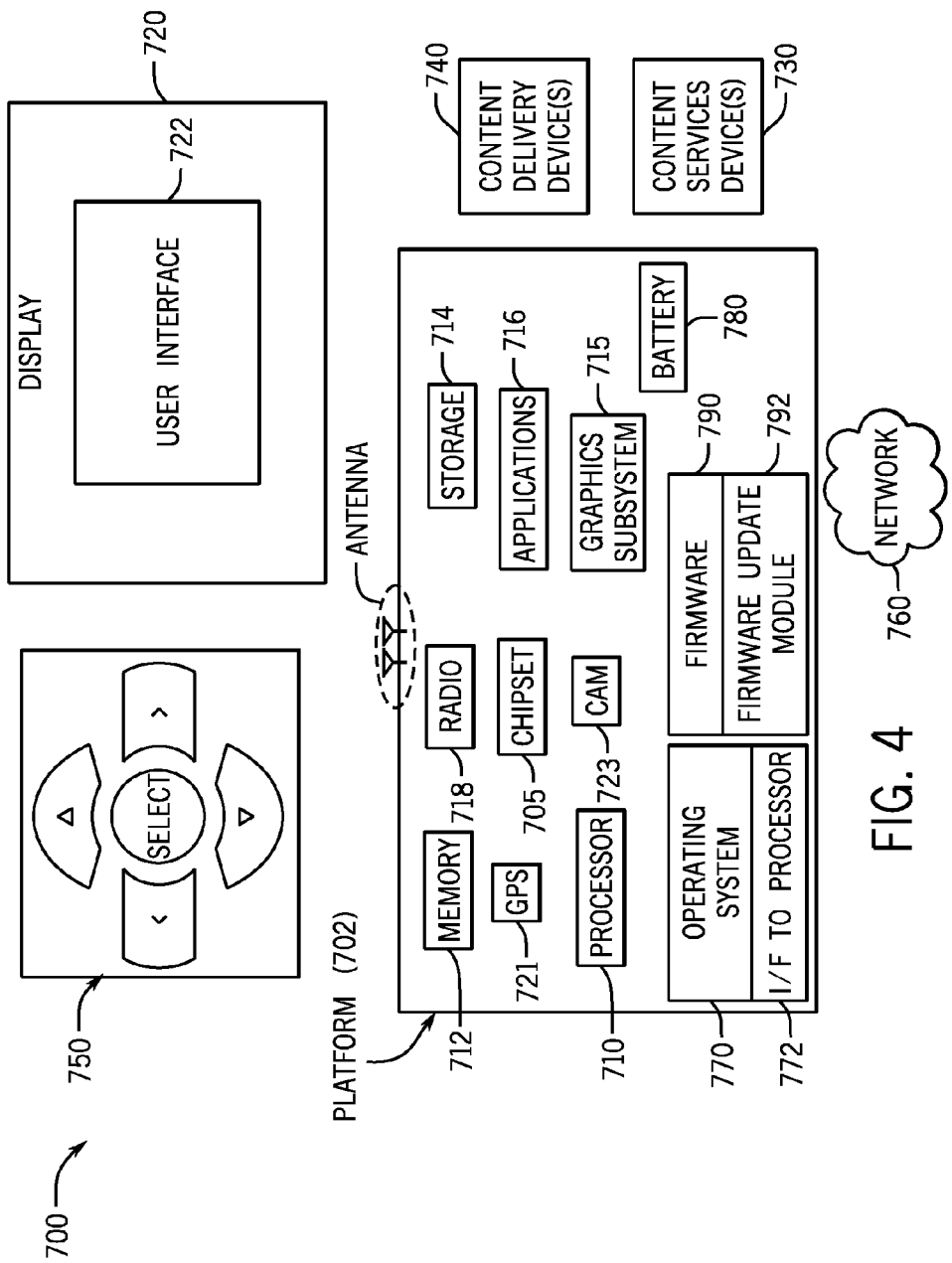
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/ or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
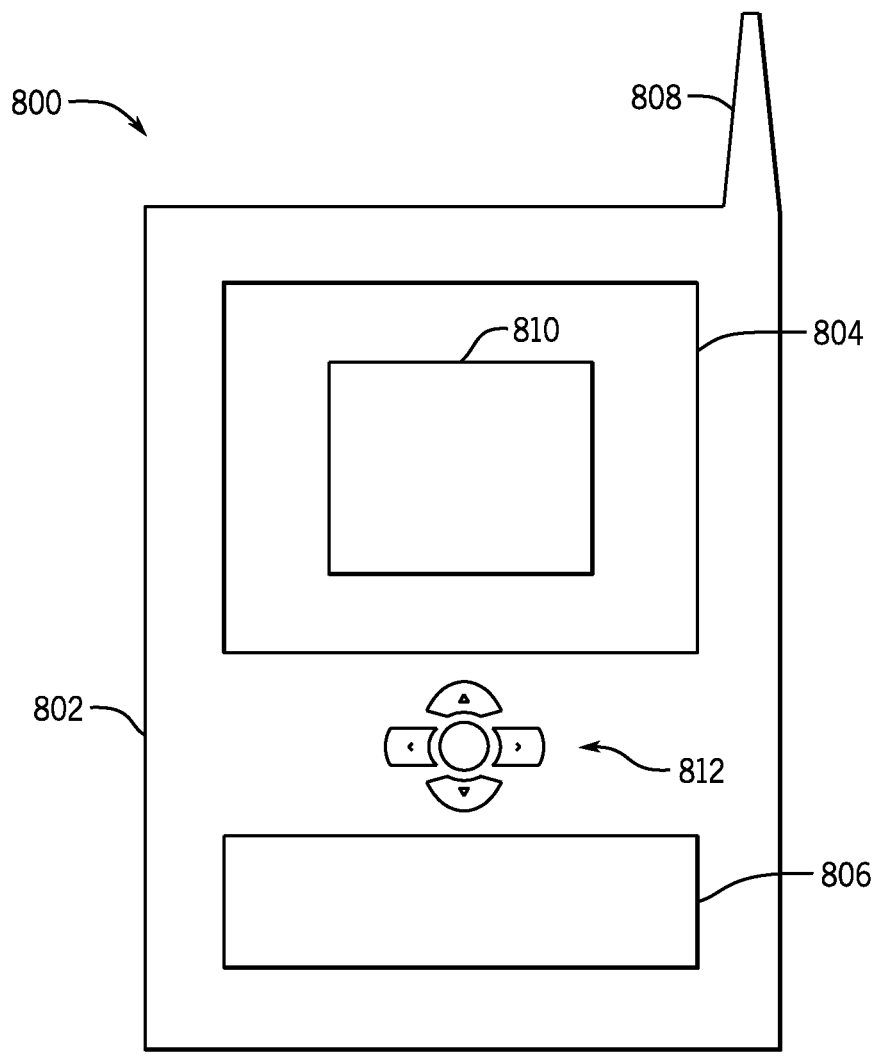
FIG. 5 is a front elevational view for one embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a method comprising compressing data at a compression ratio, sending, from a display engine, compressed data across a display interface to a display panel, using a checksum to enable the display panel to determine if data was lost in compression, if so, receiving information from the display panel to indicate compression disparities; and adapting the compression based on the information from the display panel. The method wherein, depending on the information, adapting the compression includes changing at least one of lane width, bit rate, and refresh rate. The method may include using compression to reduce at least one of lane width, bit rate, or refresh rate. The method may include using compression to reduce power consumption. The method may include choosing the compression ratio to minimize lane width and bit rate. The method wherein receiving information includes receiving information that indicates a number of disparities. The method wherein receiving information includes reading a register on the display panel. A method comprising receiving, in a display panel, compressed data and a checksum across a display interface, decompressing the compressed data, calculating another checksum for the decompressed data, comparing the another checksum to the received checksum, and transmitting an indication of the number of disparities to said display engine. The method may include storing the number of disparities in a register readable by a platform coupled to the panel.

Another example embodiment may be one or more non-transitory computer readable media storing instructions executed by a processor to perform a sequence comprising compressing data at a compression ratio, sending, from a display engine, compressed data across a display interface to a display panel, using a checksum to enable the display panel to determine if data was lost in compression, if so, receiving information from the display panel to indicate compression disparities; and adapting the compression based on the information from the display panel. The media wherein, depending on the information, adapting the compression includes changing at least one of lane width, bit rate, and refresh rate. The media may include said sequence including using compression to reduce at least one of lane width, bit rate, or refresh rate. The media may include said sequence including using compression to reduce power consumption. The media may include said sequence including choosing the compression ratio to minimize lane width and bit rate. The media wherein receiving information includes receiving information that indicates a number of disparities. The media wherein receiving information includes reading a register on the display panel.

In another example embodiment may be an apparatus comprising a processor to compress data at a compression ratio, send, from a display engine, compressed data across a display interface to a display panel, use a checksum to enable the display panel to determine if data was lost in compression, if so, receive information from the display panel to indicate compression disparities, and adapt the compression based on the information from the display panel and a storage coupled to said processor. The apparatus wherein, depending on the information, said processor to adapt the compression includes changing at least one of lane width, bit rate, and refresh rate. The apparatus of said processor to use compression to reduce at least one of lane width, bit rate, or refresh rate. The apparatus of said processor to use compression to reduce power consumption. The apparatus of said processor to choose the compression ratio to minimize lane width and bit rate. The apparatus of said processor to receive information by receiving information that indicates a number of disparities. The apparatus of said processor to receive information by reading a register on the display panel. The apparatus of said processor including a display panel communicatively coupled to the processor. The apparatus of said processor including a battery coupled to the processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   receiving, in a display panel, from a platform, compressed data and a checksum across a display interface;
   decompressing the compressed data in the display panel;
   calculating another checksum for the decompressed data in the display panel;
   generating in the display panel, a number of disparities from the checksums; and
   transmitting from the display panel the number of disparities to the display engine.

2. The method of claim 1 including storing results in a register readable by a platform coupled to the panel.

3. A display panel comprising:

a processor to receive, from a platform, in a display panel, compressed data and a checksum across a display interface, decompress the compressed data the display panel, calculate another checksum for the decompressed data in the display panel, generate in the display panel, a number of disparities from the checksums, and transmit from the display panel the number of disparities to the display engine; and a memory coupled to said processor.

4. The panel of claim 3, said processor to store the results in a register readable by a platform coupled to the panel.

5. One or more non-transitory computer readable media storing instructions to perform a sequence comprising:

receiving, in a display panel, from a platform, compressed data and a checksum across a display interface;

decompressing the compressed data in the display panel;

calculating another checksum for the decompressed data in the display panel;

generating in the display panel, a number of disparities from the checksums; and transmitting from the display panel the number of disparities to the display engine.

6. The media of claim 5, further storing instruction to perform a sequence including storing the results in a register readable by a platform coupled to the panel.

* * * * *